US012056683B2

(12) United States Patent
Muncey et al.

(10) Patent No.: US 12,056,683 B2
(45) Date of Patent: *Aug. 6, 2024

(54) LINKING A TRANSACTION ACCOUNT WITH A FORM FACTOR

(71) Applicant: American Express Travel Related Services Company, Inc., New York, NY (US)

(72) Inventors: Jason E. Muncey, Glendale, AZ (US); Keshav A. Narsipur, Chandler, AZ (US); Sreenivasan B. Parameshwara, Phoenix, AZ (US); Manoj Krishnamma Thulaseedharan Pillai, Scottsdale, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 39 days.

This patent is subject to a terminal disclaimer.

(21) Appl. No.: 16/249,668

(22) Filed: Jan. 16, 2019

(65) Prior Publication Data
US 2019/0172054 A1    Jun. 6, 2019

Related U.S. Application Data

(63) Continuation of application No. 14/625,865, filed on Feb. 19, 2015, now Pat. No. 10,223,689.
(Continued)

(51) Int. Cl.
G06Q 20/20 (2012.01)
G06F 16/955 (2019.01)
(Continued)

(52) U.S. Cl.
CPC ..... G06Q 20/3278 (2013.01); G06F 16/9554 (2019.01); G06K 19/0702 (2013.01);
(Continued)

(58) Field of Classification Search
CPC ............ G06F 16/9554; G06K 19/0702; G06K 19/0716; G06Q 20/105; G06Q 20/20;
(Continued)

(56) References Cited

U.S. PATENT DOCUMENTS 9,331,996 B2   5/2016   Musfeidt
9,589,264 B2   3/2017   Deliwala
(Continued)

OTHER PUBLICATIONS

Apple Announces Apple Pay "Transforming Mobile Payments with an Easy, Secure & Private Way to Pay", dated Sep. 9, 2014, Nat Kerris, Trudy Muller. (Year: 2014).*
(Continued)

Primary Examiner — Hai Tran
(74) Attorney, Agent, or Firm — Thomas | Horstemeyer, LLP

(57) ABSTRACT

Systems and methods may comprise RFID data acquisition technology which may be embedded in a fob or tag for use in completing financial transactions. This fob may a self-contained device which includes a transponder and which may be contained on any portable form factor. For instance, the tag may be housed in a wearable transaction instrument, such as an activity tracker. The tag is configured to be used in concert with an RFID reader device.

20 Claims, 5 Drawing Sheets

Related U.S. Application Data

(60) Provisional application No. 62/090,153, filed on Dec. 10, 2014.

(51) Int. Cl.
*G06K 19/07* (2006.01)
*G06Q 20/10* (2012.01)
*G06Q 20/32* (2012.01)
*G06Q 20/38* (2012.01)

(52) U.S. Cl.
CPC ....... *G06K 19/0716* (2013.01); *G06Q 20/105* (2013.01); *G06Q 20/20* (2013.01); *G06Q 20/204* (2013.01); *G06Q 20/3224* (2013.01); *G06Q 20/3226* (2013.01); *G06Q 20/385* (2013.01)

(58) Field of Classification Search
CPC ............. G06Q 20/204; G06Q 20/3224; G06Q 20/3226; G06Q 20/385
USPC .......................................................... 705/44
See application file for complete search history.

(56) References Cited

U.S. PATENT DOCUMENTS

| | | | |
|---|---|---|---|
| 9,721,245 B2 | 8/2017 | Deliwala | |
| 2002/0116343 A1 | 8/2002 | Nakamura | |
| 2005/0102188 A1* | 5/2005 | Hutchison | G06Q 20/02 705/39 |
| 2005/0108096 A1 | 5/2005 | Burger | |
| 2005/0116026 A1 | 6/2005 | Burger | |
| 2012/0239543 A1 | 9/2012 | Ryan | |
| 2013/0080276 A1* | 3/2013 | Granbery | G06Q 20/3823 705/39 |
| 2014/0070001 A1* | 3/2014 | Sanchez | G06Q 20/40 235/380 |
| 2015/0032625 A1 | 1/2015 | Dill | |
| 2015/0161587 A1* | 6/2015 | Khan | G06Q 20/3223 705/44 |
| 2015/0348009 A1* | 12/2015 | Brown | G06Q 20/20 705/16 |
| 2015/0350814 A1* | 12/2015 | Krochmal | H04W 4/80 455/41.2 |
| 2015/0350865 A1* | 12/2015 | Conn | H04W 76/14 455/41.2 |
| 2016/0148026 A1* | 5/2016 | Grimaux | G06Q 10/087 340/10.1 |
| 2017/0132608 A1* | 5/2017 | Jardany | H04B 5/0062 |
| 2020/0118112 A1* | 4/2020 | Jardany | G06K 19/0723 |

OTHER PUBLICATIONS

Google NPL (non-patent literature) Search, dated Jan. 3, 2022. (Year: 2022).*
"Apple Watch and Apple Pay: These Are Apple's Newest Foes", Victor Luckerson, dated Sep. 10, 2014. (Year: 2014).*
Non-Final Office Action dated Jul. 14, 2017 in U.S. Appl. No. 15/629,256.
Final Office Action dated Nov. 29, 2017 in U.S. Appl. No. 15/629,256.
Advisory Action dated Mar. 8, 2018 in U.S. Appl. No. 15/629,256.
Final Office Action dated May 11, 2017 in U.S. Appl. No. 15/411,098.
Notice of Allowance dated Jun. 9, 2017 in U.S. Appl. No. 15/411,098.
Non-Final Office Action dated Aug. 14, 2018 in U.S. Appl. No. 16/023,412.
Advisory Action dated May 10, 2019 in U.S. Appl. No. 16/023,412.
Office Action dated Aug. 25, 2016 in U.S. Appl. No. 14/625,824.
Office Action dated Feb. 10, 2017 in U.S. Appl. No. 15/411,098.
Notice of Allowance dated Dec. 22, 2016 in U.S. Appl. No. 14/625,824.
Notice of Allowance dated May 31, 2018 in U.S. Appl. No. 15/629,256.
Application dated Jun. 29, 2018 in U.S. Appl. No. 16/023,412.
Non-Final Office Action dated Jul. 31, 2017 in U.S. Appl. No. 14/625,865.
Final Office Action dated Nov. 24, 2017 in U.S. Appl. No. 14/625,865.
Advisory Action dated Feb. 26, 2018 in U.S. Appl. No. 14/625,865.
Non-Final Office Action dated May 1, 2018 in U.S. Appl. No. 14/625,865.
Final Office Action dated Aug. 2, 2018 in U.S. Appl. No. 14/625,865.
Advisory Action dated Sep. 13, 2018 in U.S. Appl. No. 14/625,865.
Notice of Allowance dated Dec. 5, 2018 in U.S. Appl. No. 14/625,865.
Final Office Action dated Oct. 3, 2019 in U.S. Appl. No. 16/023,412.
Non-Final Office Action date Jun. 10, 2019 in U.S. Appl. No. 16/249,668.
Final Office Action dated Feb. 5, 2019 in U.S. Appl. No. 16/023,412.

* cited by examiner

LINKING A TRANSACTION ACCOUNT WITH A FORM FACTOR

CROSS-REFERENCE TO RELATED APPLICATIONS

This application is a continuation of, claims priority to and the benefit of, U.S. Ser. No. 14/625,865 filed Feb. 19, 2015 and entitled "SYSTEM AND METHOD FOR OVER THE AIR PROVISIONED WEARABLE CONTACTLESS PAYMENTS." The '865 application claims priority to and the benefit of U.S. Provisional Patent Application Ser. No. 62/090,153 filed Dec. 10, 2014 and entitled "SYSTEM AND METHOD FOR USING FLEXIBLE CIRCUITRY IN PAYMENT ACCESSORIES." The contents of both are incorporated herein by reference in their entirety for all purposes.

FIELD OF DISCLOSURE

The present disclosure generally relates to payment devices, and more specifically, to wearable RFID enabled payment devices.

BACKGROUND OF THE DISCLOSURE

The proliferation of transaction accounts, which allow the cardholder to pay with credit rather than cash, started in the United States in the early 1950s. Initial transaction cards were typically restricted to select restaurants and hotels, and the cards were often limited to an exclusive class of individuals. Since the introduction of plastic credit cards, the use of transaction cards has rapidly proliferated from the United States, to Europe, and then to the rest of the world. Transaction cards are not only information carriers transaction facilitators, but also typically allow a consumer to pay for goods and services without the need to constantly possess cash. Alternatively, if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for many companies to differentiate their cards from competitor's cards.

These transaction cards, while useful for completing financial transactions and highly portable, are often undesirable due to the requirement for a carrier, generally a wallet or purse. Therefore, a need exists for a system and method to address the above recited needs and for increasing portability and distribution of control of a transaction instrument.

SUMMARY OF THE DISCLOSURE

These above disclosed needs are successfully met via the disclosed system and method. According to various embodiments, a method is disclosed. The method may comprise pre-provisioning, by a computer based system for transmitting information, an alias code onto a secure chip. The method may comprise transmitting, by the computer based system, a secure chip identifier (ID) of the secure chip and an alias code association to a transaction account issuer after pre-provisioning is assigned. The method may comprise embedding, by the computer based system, the secure chip into a wearable form factor. The method may comprise storing, by the computer based system, at least one of the secure chip ID or the alias code in a memory housed in the wearable form factor. A native application of the wearable form factor may be utilized by a user. The native application of the wearable detects and reads the secure chip ID from the wearable form factor microprocessor memory. The native application transmits at least one of the secure chip ID or the alias code to at least one of a transaction issuer or a transaction processor application passively.

According to various embodiments, a user may securely log into a transaction account issuer app and associates at least one of a newly requested or existing transaction account the wearable form factor. The wearable form factor is utilized in a transaction via at least one of the alias code or the secure chip. A user may purchase the wearable form factor. The native application of the wearable form factor may be downloaded by the user. The wearable form factor housing may comprise at least one of a processing core, a battery, a motor, and a sensor. A radio-frequency identification reader may be coupled to a point of sale system. The wearable form factor may be at least one of a bracelet, ring, wrist band, key ring fob, retractable id, necklace, jewelry charm, lanyard, watch, band, or pin. The user may configure the secure chip to be available for use for a limited duration, a reoccurring period, limited geographic use, for limited transaction types, a capped transaction amount, use at specified merchants, and capped to a specified balance. The secure chip may be configured to be used in credit transactions, charge account transactions, loyalty point transactions, pre-paid transactions and debit transactions. The secure chip may be configured to grant physical access to at least one of transportation and secure locations. The wearable form factor may be an activity tracker. The memory of the wearable form factor may be isolated from communication with the secure chip.

According to various embodiments, a wearable form factor device is disclosed herein. The wearable form factor device may comprise a tag configured for radio frequency identification, wherein the tag comprises a secure chip having a secure chip identifier, wherein the tag comprises an antenna, wherein an alias code is pre-provisioned on the secure chip. The wearable form factor device may comprise a processing core housed within the wearable form factor. The wearable form factor device may comprise a memory housed with the wearable form factor coupled to the processing core, wherein an secure chip identifier is stored on the memory. The secure chip and the memory are isolated from data communication. The wearable form factor device may comprise a battery housed with the wearable form factor coupled to the processing core.

The secure chip identifier and alias code association may be transmitted to a transaction account issuer. A native application of the wearable form factor device is utilized by a user, wherein the native application of the wearable form factor device detects and reads the secure chip ID from the memory, and wherein the native application transmits at least one of the secure chip ID or the alias code to at least one of a transaction issuer or transaction processor application passively. The wearable form factor device may comprise a motor housed within the wearable form factor and/or a sensor housed within the wearable form factor. A user may securely log into a transaction account issuer app and associates at least one of a newly requested or existing transaction account the to wearable form factor device. The wearable form factor device may be utilized in a transaction via at least one of the alias code or the secure chip. The wearable form factor device may be an activity tracker.

BRIEF DESCRIPTION OF THE DRAWINGS

The accompanying drawings, wherein like numerals depict like elements, illustrate exemplary embodiments of the invention, and together with the description, serve to explain the principles of the invention. In the drawings.

DETAILED DESCRIPTION

Figure 1:
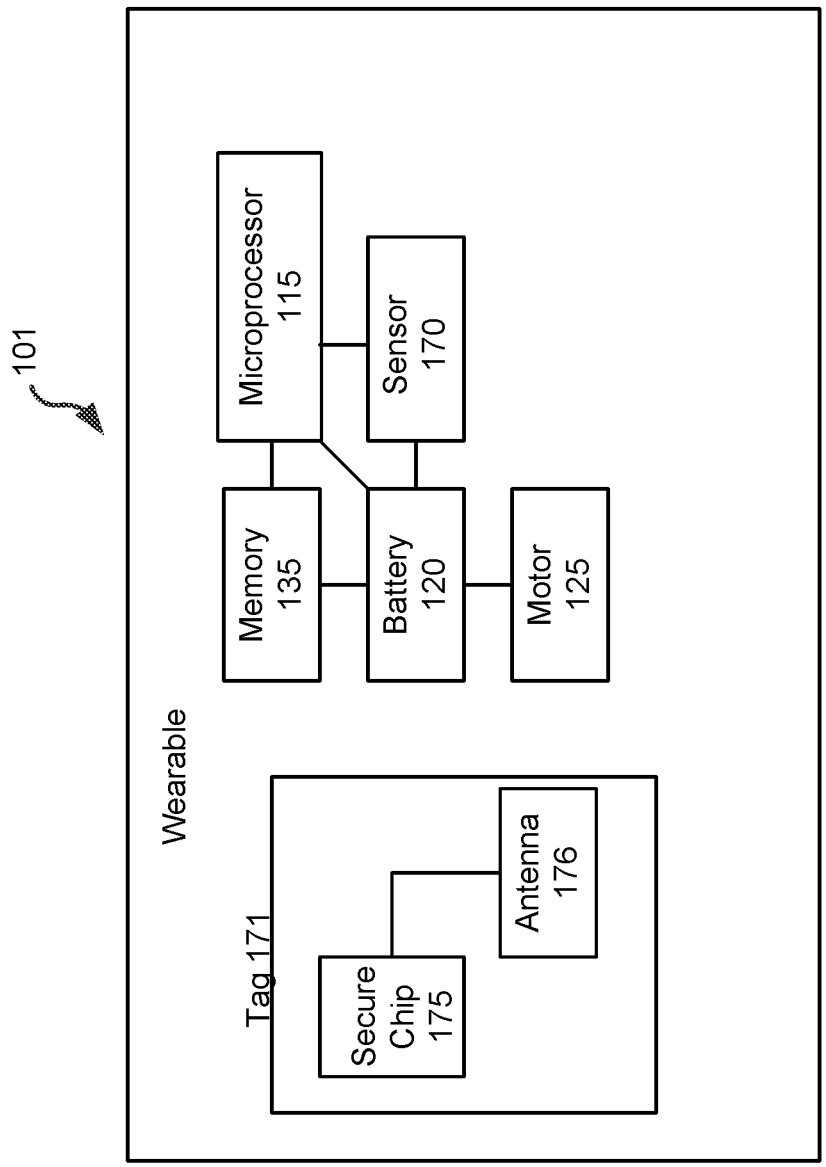
FIG. 1 illustrates an exemplary wearable comprising a RF transaction device in accordance with various embodiments.

The detailed description of various embodiments herein makes reference to the accompanying drawings and pictures, which show exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may include or interface with any accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein, an RFID reader may be any reader device configured to communicate using a RFID internal antenna and/or an external RFID antenna, where the external antenna may be made remote to the RFID reader using a suitable cable and/or data link. The RFID reader may be further in communication with a merchant system via one or more data links.

In various embodiments, the methods and systems described herein are implemented using RFID and near field communication technology. However, those skilled in the art will appreciate that in various embodiments in place of RFID communication other wireless communication techniques and hardware/software is envisioned. For instance, in various embodiments the systems described herein may comprise a transmitter, transponder and/or receiver. These transmitter, transponder and/or receiver may communicate over any wireless communication mode, such as radio frequency communication, microwave communication or infrared (IR) short-range communication, and/or the like. In various embodiments the systems described herein may communicate over a network and/or using GPS, Bluetooth, satellite, wireless USB, and/or the like using existing or future techniques.

In various embodiments, and with reference to FIG. 1, the present system may comprise RFID data acquisition technology which may be embedded in a tag 171 or tag for use in completing financial transactions and transfer data. This tag 171 may be a self-contained device which includes and/or is coupled to a transponder. Tag 171 may be contained on any portable form factor. For instance, the tag 171 may be housed in a wearable transaction instrument, such as a wrist band, bracelet, ring, retractable id, necklace, jewelry charm, lanyard, watch, band, pin, and/or the like. The tag 171 is configured to be used in wireless communication with an RFID reader device.

In various embodiments, though it may be made from any suitable material, the wearable RF transaction device 101 housing/bracelet is made from medical-grade, hypoallergenic rubber. It may be substantially water resistant and/or waterproof. The wearable RF transaction device 101 housing/bracelet is smooth, flexible and latex-free.

In various embodiments, a battery may be coupled to tag 171 to power the transponder. In which case, the internal circuitry of tag 171 (including the transponder) may draw its operating power from the battery power source. Alternatively, tag 171 may exist independent of an internal power source. In this instance, the internal circuitry of tag 171 (including the transponder) may gain its operating power directly from an RF interrogation signal and/or a combination of battery and RF interrogation signal power. In conventional fob powering technologies used, tag 171 is typically activated upon presenting tag 171 to/in the field of an interrogation signal. In this regard, tag 171 may be activated irrespective of whether the user desires such activation. In various embodiments, secondary information such as authorization data and/or a PIN (personal identification number) may be used with RF transaction device 101 for identification and authentication.

In various embodiments, consumer payment information is transmitted using RF technology, where information can be accessed without physical procession of the payment device (e.g., card, tag or fob). The data transmitted may be secured by encryption.

In the scenario where RF transaction device 101 comprises multiple transaction accounts, instead of relying on a counter and an algorithm to determine which should be used or other selection protocol, a PIN and/or authorization data provided by the account holder may be used. The terms account holder or cardmember shall mean any person, entity, government organization, business, machine associated with a transaction account, regardless of whether a physical card is associated with the account. For example, the may include a transaction account owner, an transaction account user, an account affiliate, a child account user, a subsidiary account user, a beneficiary of an account, a custodian of an account, or any other person or entity affiliated or associated with a transaction account.

When RF transaction device 101 is presented to a RF reader, the account holder may be prompted to enter a PIN and/or authorization data. The PIN and/or authorization data may authenticate the user to use the account. If the PIN for the charge account is used, that account is used in the transaction request that is provided to the RF reader. This approach includes a RF transaction device 101 with greater processing capabilities and extends the security of the account codes stored in RF transaction device 101 by requesting an explicit authentication of the account by the accountholder before the payment is consummated.

In various embodiments, a method for facilitating access to at least one data set that is stored on RF transaction device 101 is practiced. The data set may correspond to a transaction account. The RF transaction device 101 in accordance with this disclosure may be used to pay for acquisitions, obtain access or transportation, provide identification, pay an amount, receive payment, redeem reward points and/or the like. See, for example, Sony's "Near Field Communication" ("NFC") standard which is touted as operating on 13.56 MHz and allowing the transfer of any kind of data between NFC enabled devices and across a distance of up to twenty centimeters. See also, Bluetooth chaotic network configurations; which are incorporated herein by reference.

As used herein, the terms "account information" or "data set" may include any set of information and/or the like which may be used, for example, in completing a transaction. For example, data sets may include information related to credit transaction accounts, debit transaction accounts, membership club accounts, loyalty program accounts, speed pass accounts, rental car memberships, frequent flyer programs, to coupons, tickets and/or the like. This information may include membership identifiers, account code(s), personal information, balances, past transaction details, account issuer routing code(s), cookies, identifiers, security codes, and/or any other information. The data set may additionally include an issuer defined management process for determining which subsets of data are to be provided to an issuer or merchant. In some instances, a data set may be associated with one or more account codes corresponding to accounts maintained by the account issuer. The various data sets associated with RF transaction device 101 may be stored on RF transaction device 101 and/or with the transaction account issuer or transaction processor.

RF transaction device 101 may be configured to communicate via a radio frequency transponder to a merchant system or account system (by a RFID reader). In yet another embodiment, RF transaction device 101 may be configured to comprise one or more antennae that are configured to send and receive information and the transaction device may be responsive to different RF frequencies. In one exemplary embodiment, each antenna may be configured to send and/or receive and/or communicate using a particular protocol and/or frequency. Thus, RF transaction device 101 may be configured to communicate with two or more reader devices that each communicate with the transaction device using different transmission frequencies.

RF transaction device 101 may include an antenna 176 for receiving an interrogation signal from an RFID reader via an antenna 176. RF transaction device 101 antenna 176 may be in communication with a transponder. In one exemplary embodiment, the transponder may be a 13.56 MHz transponder compliant with the ISO/IEC 14443 standard, and antenna 176 may be of the 13 MHz variety. The transponder may be in communication with a transponder compatible modulator/demodulator configured to receive the signal from the transponder and configured to modulate the signal into a format readable by any later connected circuitry. Further, modulator/demodulator may be configured to format (e.g., demodulate) a signal received from the later connected circuitry in a format compatible with the transponder for transmitting to an RFID reader via antenna 176. For example, where transponder is of the 13.56 MHz variety, modulator/demodulator may be ISO/IEC 14443-2 compliant. In various embodiments, global positioning system software and hardware to effect GPS and/or geotagging functionality may be included in the device.

Modulator/demodulator may be coupled to a protocol/sequence controller for facilitating control of the authentication of the signal provided by the RFID reader, and for facilitating control of the sending of a transaction device account code. In this regard, protocol/sequence controller may be any suitable digital or logic driven circuitry capable of facilitating determination of the sequence of operation for the transaction device inner-circuitry. For example, protocol/sequence controller may be configured to determine whether the signal provided by the RFID reader is authenticated, and thereby providing to the RFID reader the account code stored on RF transaction device 101.

Protocol/sequence controller may be further in communication with authentication circuitry for facilitating authentication of the signal provided by the RFID reader. Authentication circuitry may be further in communication with a non-volatile secure memory database. Secure memory database may be any suitable elementary file system such as that defined by ISO/IEC 7816-4 or any other elementary file system allowing a lookup of data to be interpreted by the application on the fob.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

RF transaction device 101 may also comprise feedback. For example, the optional feedback may be in the form of an LED, LED screen and/or other visual display which is configured to light up or display a static, scrolling, flashing and/or other message and/or signal to inform RF transaction device's 101 user or any other third party that the transaction is initiated (e.g., RF transaction device 101 is being interrogated), RF transaction device 101 is valid (e.g., RF transaction device 101 is authenticated), transaction is being processed, (e.g., RF transaction device 101 account code is being read by RFID reader), the transaction is accepted or denied (e.g., transaction approved or disapproved, that RF transaction device 101 is receiving power, and/or RF transaction device 101 is transmitting information. Various colors for different activities and/or patterns of indicators, such as visual indicators and/or blinking lights may be practiced. Such optional feedback may or may not be accompanied by an audible indicator for informing RF transaction device 101 user of the transaction status. The audible feedback may be a simple tone, multiple tones, musical indicator, and/or voice indicator configured to signify when RF transaction device 101 is being interrogated, the transaction status, or the like. Thus, RF transaction device 101 may comprise a speaker.

Authentication circuitry in the RFID reader may be configured to authenticate the signal provided by RF transaction device 101 in a similar manner that authentication circuitry may be configured to authenticate the signal provided by the RFID reader. In one exemplary embodiment, RF transaction device 101 and the RFID reader engage in mutual authentication. In this context, "mutual authentication" may mean that operation of the system may not take place until RF transaction device 101 authenticates the signal from the RFID reader, and the RFID reader authenticates the signal from RF transaction device 101.

Figure 2:
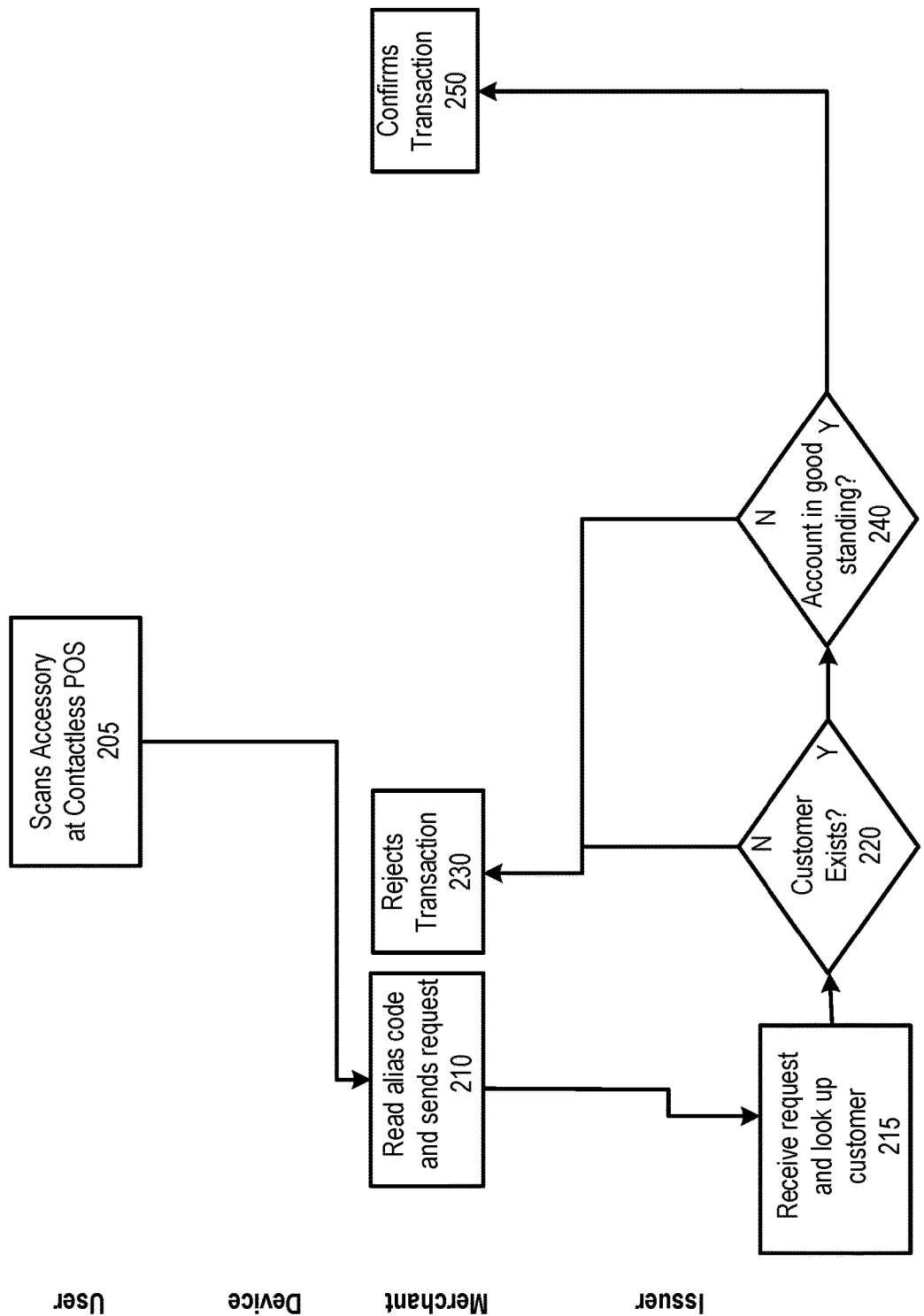
FIG. 2 illustrates a flowchart of an exemplary authentication process in accordance with various embodiments.

According to various embodiments and with reference to FIG. 2, the wearable may be scanned by the user at a contactless POS system (Step 205). The merchant POS system may read the alias code and send a request to an issuer/processor (Step 210). The issuer/processor may receive the transmitted request and attempt to retrieve associated customer data (Step 215). The issuer/processor may determine if a record of the customer exists in the system. (Step 220). In response to there being no record of the customer in the system a transmission may be sent to the merchant, via the POS system, to reject the transaction (Step 230). In response to there being a record of the customer in the system, a determination is made that the customer account is in good standing (Step 240). In response to the customer account being in good standing, a transmission may be sent to the merchant, via the POS system, to accept the transaction (Step 250).

Figure 3:
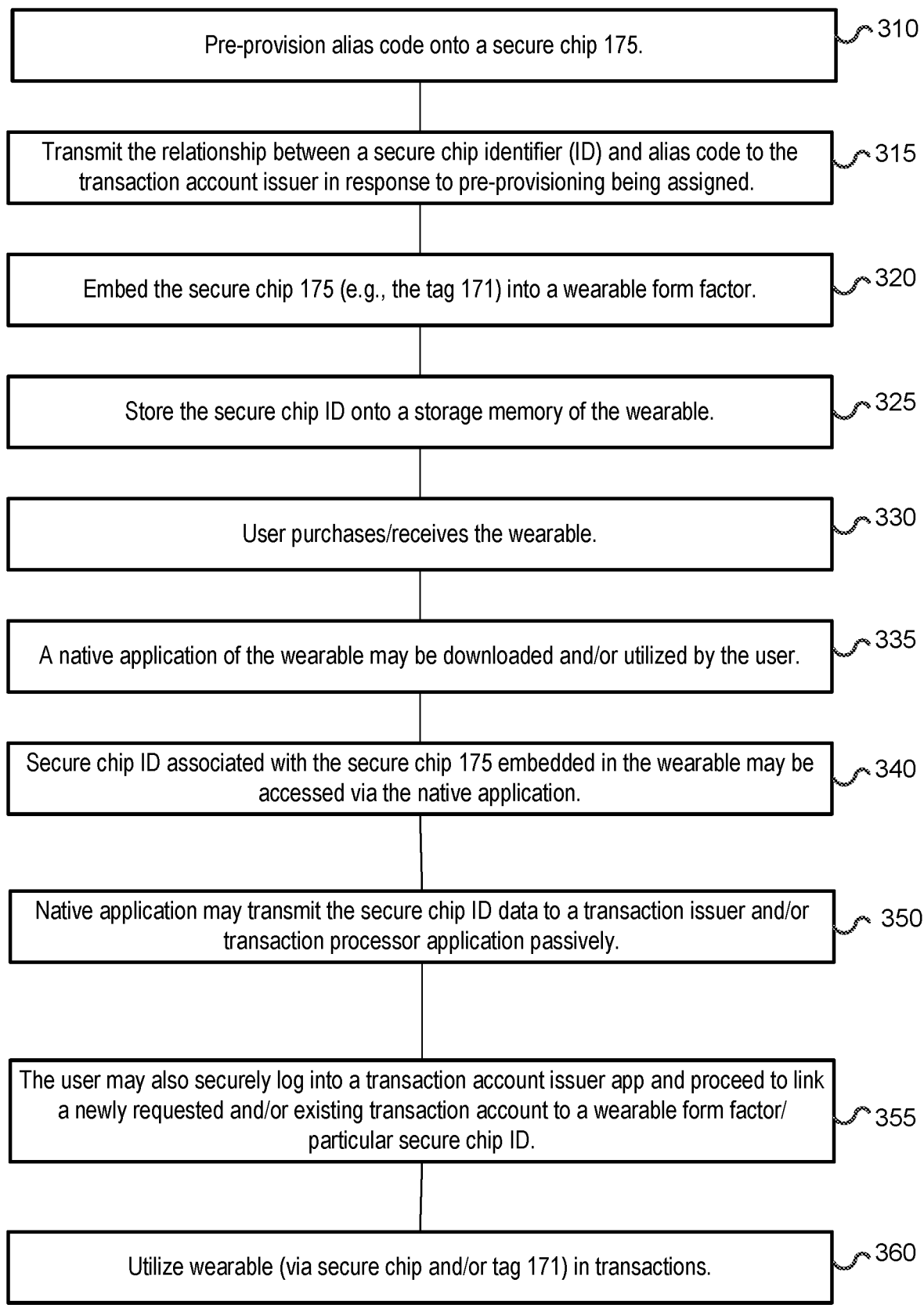
FIG. 3 illustrates the pre-provisioning of a secure chip in accordance with various embodiments.

According to various embodiments and with reference to FIGS. 1 and 3 an existing secure chip 175 and NFC antenna 176 are bonded together to create a tag 171 that can be personalized and form RF transaction device 101. Alias credentials may be pre-provisioned onto a secure chip 175 (Step 310). The personalization bureau shares the relationship between the secure chip identifier (ID) and alias code/number with the transaction account issuer after personalization is complete (Step 315). The tag 171 is then embedded into the wearable (Step 320). The secure chip ID, likely during manufacturing, is stored to a memory of the wearable form factor (such as, by flashing the secure chip ID onto the ROM in the wearable) (Step 325). The wearables are then shipped to the end retailer or distribution center, all bands have the payment feature embedded in the band. A user may purchase and/or receive the wearable (Step 330). After purchasing the wearable, the customer pairs the wearable with a companion application ("app" and/or native application). A user may download the wearable app (Step 335). The secure chip ID is then retrieved from the wearable, such as by the companion application and stored by the companion app (Step 340). The companion app may transmit the secure chip ID to the transaction issuer app (Step 350). This may be a passive process, where active initiation by the transaction account holder is not performed.

A transaction account holder then chooses to connect their transaction account to the wearable. To do so, the transaction account holder logs in with their user ID and password to an app, such as a transaction account app and/or transaction account issuer app, and selects an eligible transaction account to link to the wearable (Step 355). At the same time, the transaction account issuer may obtain the secure chip ID off that wearable and is then able to link the alias associated with that secure chip ID to the transaction account number per the transaction account holder's selection. The contactless payment feature is then activated within the transaction account issuer's systems and the transaction account holder can tap to pay with their transaction account via the wearable (Step 360).

Figure 4:
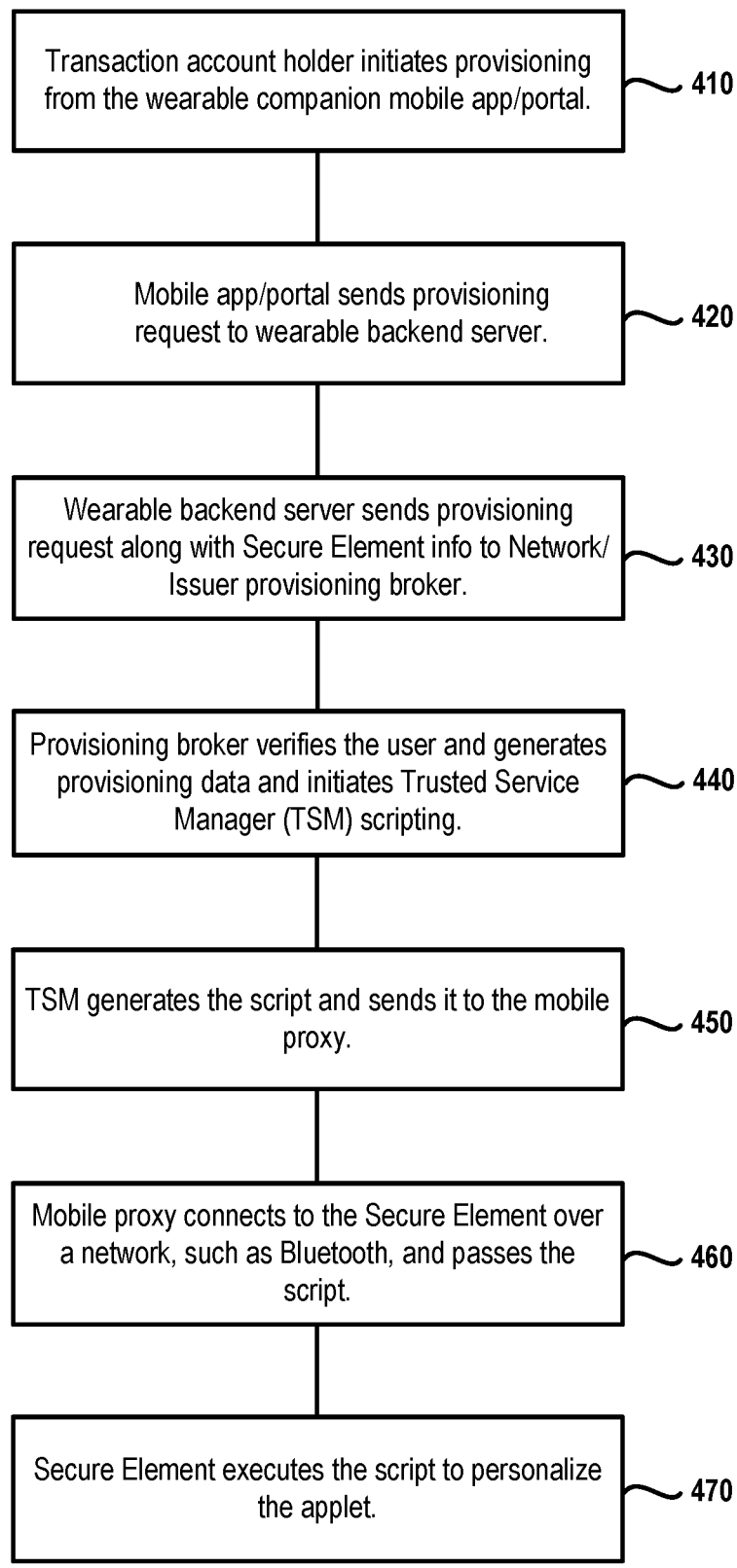
FIG. 4 illustrates over the air provisioning of a secure chip in accordance with various embodiments.
Figure 5:
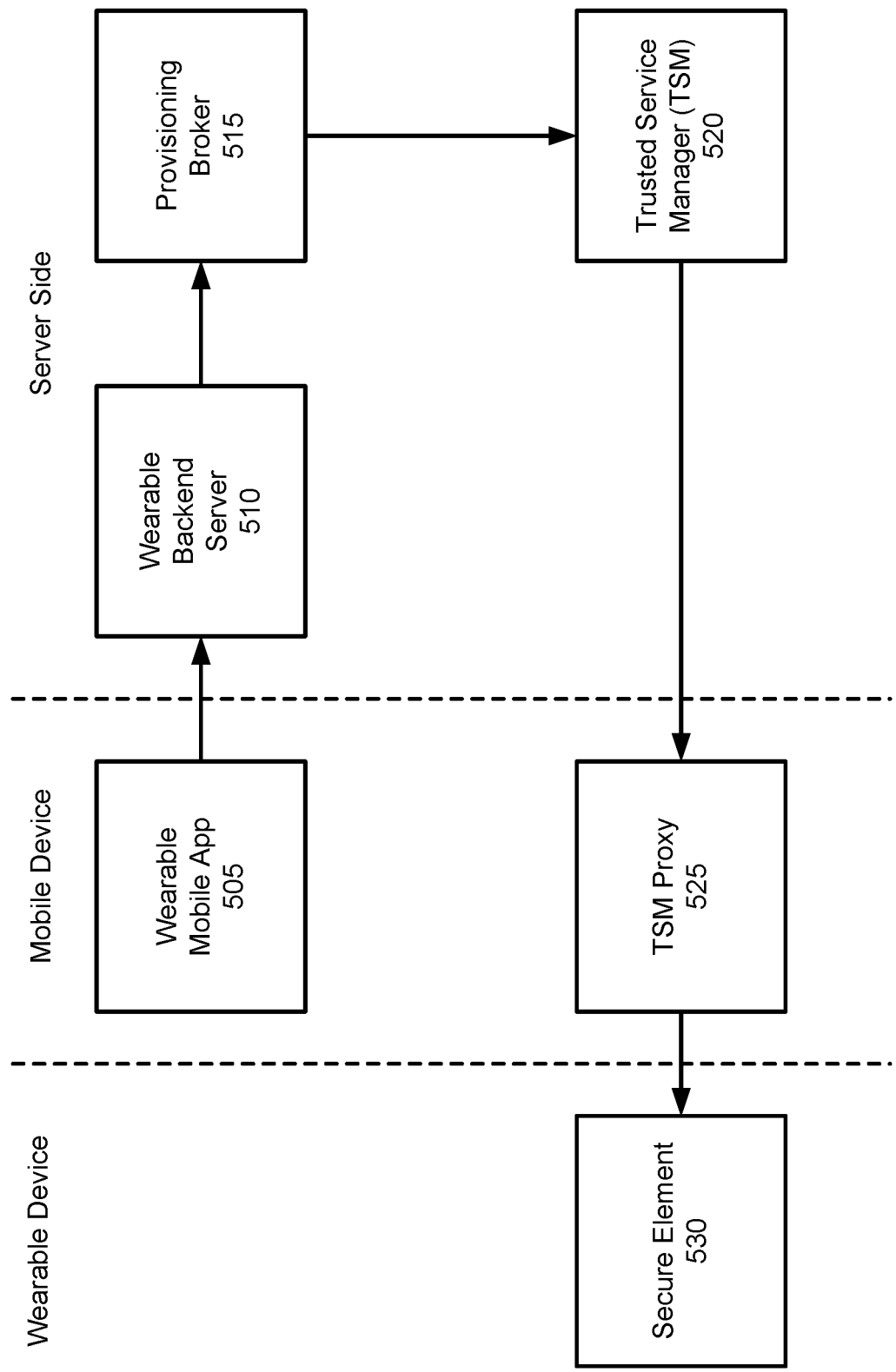
FIG. 5 illustrates a flowchart in accordance with various embodiments.

According to various embodiments and with reference to FIGS. 4 and 5, a TSM proxy app/module on the mobile phone may be used to provision the secure chip 175. A trusted service manager (TSM) is a role in a near field communication ecosystem. It acts as a neutral broker that sets up business agreements and technical connections with mobile network operators, phone manufacturers or other entities controlling the secure element on mobile phones. The trusted service manager enables service providers to distribute and manage their contactless applications remotely by allowing access to the secure element in NFC-enabled handsets. The proxy could be a standalone app or embedded module within a third party app. The TSM proxy acts as pass thru communication channel between TSM server and the secure element, e.g., secure chip 175, on the wearable device.

The TSM proxy app, running on a mobile device, may connect to a TSM server over a network such as a mobile network operator or Wi-Fi networks. The TSM proxy app may connect to Secure Element, such as a secure element embedded in a wearable form factor over an available network, such as via a Bluetooth connection. The TSM server may send provisioning scripts securely to the mobile proxy app using a global platform™ secure channel protocol. In response to receiving the provisioning scripts, the mobile proxy app may pass the provisioning script to the secure element (e.g., secure chip 175) over the Bluetooth.

According to various embodiments and with reference to FIG. 4, an over the air provisioning process is illustrated. For instance, a transaction account holder may initiates provisioning from the wearable companion mobile app/portal (Step 410). The mobile app/portal may transmit a provisioning request to wearable backend server (Step 420). A wearable backend server may transmit a provisioning request along with secure element (secure chip 175) data to a Network/Issuer provisioning broker (Step 430). The provisioning broker performs identification, verifications and/or validation, and generates provisioning and/or personalization data and initiates TSM scripting (Step 440). The TSM may generate the script and transmit it to the mobile proxy (Step 450). The mobile proxy may connects to the secure element (secure chip 175) over Bluetooth and passes/transmit the script to the secure element (secure chip 175) (Step 460). The secure element may execute the script to personalize the applet (Step 470). According to various embodiments, the microprocessor of the wearable and/or memory of the wearable may be in data communication with the secure chip to assist with the passing of the script to the secure element.

According to various embodiments and with reference to FIG. 5, various operations performed and/or controlled by various entities and/or systems is illustrated. For instance, a wearable device, mobile device and server side is depicted. The wearable device may house the secure element 530, such as the secure chip 175. The mobile device may run one or more app, such as a wearable application 505, a transaction issuer application and/or TSM proxy app 525. The mobile device may be in signal communication with a server side system. The server side system may be responsible for provisioning and creating a provisioning script for the secure element, such as the secure chip 175. The server side system may comprise a wearable backend server 510, a provisioning broker 515 and/or a trusted service manager (TSM) 520.

In this way, a secure chip that has not been associated with a transaction account may be embedded in a wearable form factor. At a later date, through an application, such as an application running on a mobile device, the secure chip may be provisioned with an alias credential/token by the mobile device application. For instance, the mobile device may utilize a Bluetooth connection to communicate with a microprocessor and memory of the wearable form factor. The microprocessor and memory of the wearable form factor may store and/or transmit a provisioning script for the secure chip. In response to the secure chip being provisioned with alias credentials. The user and/or a back end system may link those alias credentials to a transaction account. The wearable form factor may then be utilized in transactions.

According to various embodiments, the secure chip 175 may be reassigned alias credentials as desired. For instance, should a transaction account holder wish to associate the secure chip 175 with a new transaction account the above described process may be performed a second time. Also, a device housing the smart chip may be sold, such as on a secondary market, and the new owner may associate their transaction account via the over the air provisioning process to the secure chip 175 and/or the secure chip ID.

According to various embodiments, the RF transaction device 101 may be issued within a form factor (e.g., wearable) of about 7 by 50 millimeters. RF transaction device 101 may be a wearable. The wearable may comprise additional functionality consummated by a separate microprocessor and memory. For instance, the wearable may be a fitness tracker and/or activity tracker. An activity tracker is a device or application for monitoring and tracking fitness-related metrics such as distance walked or run, calorie consumption, calories burned and in some cases heartbeat and quality of sleep. The term is now primarily used for dedicated electronic monitoring devices that are synced, in many cases wirelessly, to a computer or smartphone for long-term data tracking, an example of wearable technology. There are also independent smartphone and Facebook™ apps (native applications and/or native apps) that may be associated with the activity tracker.

According to various embodiments and with renewed reference to FIG. 1, the wearable may comprise a processing core 115, battery 120, vibration motor 125, sensors 130 and memory 135. The processing core 115, battery 120, Bluetooth™ transmitter/receiver, vibration motor 125, sensors 130 and memory 135 may not be electrically coupled to tag 171 (e.g., secure chip and NFC antenna). The processing core 115, battery, vibration motor, sensors and memory may be housed within the same form factor as tag 171 (e.g., within the wearable).

Alias credentials are randomly assigned to tag 171. Stated another way, each tag 171 (having a secure chip ID) is personalized with a different alias credentials (proxy code). Initially, each tag 171 (e.g., antenna and secure chip ID combination) is not embedded in the wearable. Next, each personalized tag 171 is embedded in each wearable. Each wearable and/or microprocessor, with its own associated memory, within the wearable has a known ID code. The known ID code of the wearable and/or second microprocessor, alias credential, and secure chip ID is transmitted to at least one of an issuer, and/or transaction processor. At this point, the wearable is not linked to a transaction account.

The tag 171 may be stored in a second microprocessor within the second microprocessor of the wearable. Stated another way, a proxy code and/or token may be linked with the secure chip ID and the secure chip ID may be linked to the known ID code of the wearable and/or second microprocessor.

In response to a user purchasing a wearable, a native application of the wearable may be downloaded and utilized by the user. The tag 171 associated with the wearable may be accessed via the native application. The user may also securely log into a transaction account issuer app and proceed to link a newly requested and/or existing transaction account to this particular wearable ID. The transaction account issuer will then map the wearable ID to an associated tag 171. The transaction account issuer will then associate the proxy account of the tag 171 to the selected user transaction account. Then the wearable will be available for use in transactions, subject to any user conditions, similar to the user's use of the transaction account with respect to a physical card and/or other transaction instrument.

According to various embodiments, the native application of the wearable, once activated, may detect and can read a secure chip ID from microprocessor memory, and the native application may transmit the tag 171 data to a transaction issuer and/or transaction processor application passively at any time. For instance, a transaction issuer and/or transaction processor application may interrogate wearable application for tag 171 data in response to a user securely logging in to the transaction issuer and/or transaction processor application. In this way, any transaction account holder can purchase any wearable with embedded tag 171 and subsequently link the associated proxy account code to their desired and/or selected transaction account code.

With reference to FIG. 3, an exemplary flow chart depicts the process of using RF transaction device 101 is presented. For instance, a user may present RF transaction device 101 to an RF interrogation signal. This RF interrogation signal may provide power to RF transaction device 101. The interrogation signal may be verified for security purposes. In response to the interrogation signal being verified, the user is ready to transmit data set information. The user may then present RF transaction device 101 to the RFID reader/contactless reader. This RFID reader/contactless reader will generally be working in concert with or be coupled to a point of sale system (POS). The POS is configured for transmitting information related to the transaction.

In response to the user presenting the RF transaction device 101, the RFID reader/contactless reader may read data set information transmitted from RF transaction device 101. The RFID reader/contactless reader may then transmit a transaction request to a payment processor.

The payment processor may use preprogrammed logic to authorize the transaction. This pre-programmed logic may include identification of the customer, identification of account type (e.g. credit, debit, loyalty, pre-paid, charge, etc.) a verification that the account is in good standing (e.g. does not exceed credit limit, the account is not in arrears, there is enough balance in the prepaid account to cover the transaction, etc.).

If one or more of these criteria are not met the transaction may be declined. If one or more of these criteria are met, the transaction may be confirmed and the payment processor may send an approval message to the POS system. The transaction may then be consummated. In various embodiments, the GPS location of the POS system and/or the GPS location of RF transaction device 101 may be stored to a storage memory by the payment processor/transaction account issuer or RF transaction device 101.

In some instances, the account issuer that provides the transaction account code to the user may request the user to provide a PIN or other secondary identifier prior to permitting use of the transaction account code for transaction completion. In this case, a POS device may be configured to prompt user to provide the appropriate PIN for verification by RFID payment processor, merchant system, or issuer system. The user may provide the PIN and the PIN may be verified under merchant system or issuer system defined verification protocol. If the PIN is not verified, then the merchant system may terminate the transaction request.

According to various embodiments, the issuer system may compile historical use of RF transaction device 101. This historical use may be used to develop trends and user preferences. This historical use compared with other users historical use to develop recommendations. These recommendations may be presented to the user via a transaction issuer portal, direct mail offers, email offers, and/or social media messages. Additionally, this data and/or portions of this data may be shared with third party applications. In general, a user would authorize the dissemination of this RF transaction device 101 data prior to distribution.

For instance, a user may consummate a transaction for a beverage at a concert using RF transaction device 101. The issuer system may record this historical data to an established digital persona for the transaction account. This data may be pushed to a social media application, such as Foursquare. Foursquare™ may automatically record and/or broadcast the user's location via the location of the POS device or the location of RF transaction device 101. This data may be pushed to a social media application, such as Twitter™, Facebook™, and/or LinkedIn™.

In various embodiments, the user's Facebook "friends" that have also consummated a transaction at the concert may be identified from the user's Facebook account and a message may be automatically pushed to a device, such as mobile device of the user indicating that a "friend" is in attendance. Additionally, RF transaction device 101 may be used to access and gain entry to a VIP area at the concert using its NFC/RFID functionality saving time and increasing security for the user and the venue.

In various embodiments, authorized users of RF transaction device 101 may control the preferences and access to RF transaction device 101. For instance, a user may log into an online management tool using a secure logon and password. The transaction account issuer/online management system operator may verify and authenticate the logon information. A particular RF transaction device 101 may be selected by the user to be enabled in response to user selections for limited duration, a reoccurring period, limited geographic use, for limited transaction types, transaction amounts, use at specified merchants, and/or capped at a specified balance. The issuer system may record these preferences. In this way, a user may be authorized to make debit purchases using RF transaction device 101 up to $20.00, on Tuesdays, within a given geographic proximity to a community park using the transaction account issued to the user. Alternatively, resort goers may be issued RF transaction device 101 for securely purchasing items on the property. In another embodiment, a business may issue sales employees RF transaction device 101 capped at a daily per diem amount to negate the need for after-the-fact reimbursement payment processing. RF transaction device 101 may be used for other types of communication and data transfers. For example, users could access their hotel room, office, or house using a wearable to communicate with locks/access points and grant access. Users could also access their gym or public transportation by tapping their wearable. This could also be used for other types of identification, including identification in a hospital, in place of a driver's license, or in lieu of a passport.

Furthermore, a transaction device as described herein may be associated with various applications which allow the transaction devices to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, calling cards, and/or the like. Generally, the user is both the owner of the transaction account and the participant in the loyalty program; however, this association is not necessary. For example, a participant in a loyalty program may gift loyalty points to a user who pays for a purchase with his own transaction account, but uses the gifted loyalty points instead of paying the monetary value. The transaction device may furthermore be associated with coupon information or the like.

A data set may contain any type of information stored in digital format. For example, a data set may include account numbers, programs/applications, scripts, codes, cookies, instruments for accessing other data sets, and/or any other information.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the particular machines herein, and those hereinafter developed, in any suitable combination, as would be appreciated immediately by one skilled in the art. Further, as is unambiguous from this disclosure, the methods described herein may result in various transformations of certain articles.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The data sets may be annotated. This annotation may be used for types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems. The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, PALM®OS®, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. Web Sphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Java Cryptography" by Jonathan Knudson, published by O'Reilly & Associates (1998); (2) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2-6 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-6, but also to the various system components as described above with reference to FIG. 1.

In various embodiments, components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction. Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution. Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like. The terms "payment vehicle," "financial transaction instrument," "transaction instrument" and/or the plural form of these terms may be used interchangeably throughout to refer to a financial instrument. Phrases and terms similar to "merchant," "supplier" or "seller" may include any entity that receives payment or other consideration. For example, a supplier may request payment for goods sold to a buyer who holds an account with a transaction account issuer. Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account. Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

We claim:

1. A method comprising,
   receiving, by an application executed by a mobile device, a provisioning script for a secure chip having a communication antenna and a secure chip identifier (ID), the secure chip embedded in a wearable device in communication with the mobile device;
   transmitting, by the application executed by the mobile device, the provisioning script to the secure chip using a Bluetooth connection between the mobile device and the wearable device, wherein the secure chip executes the provisioning script, and wherein an alias code pre-provisioned on the secure chip is associated with a transaction account and wherein the alias code is randomly assigned to the secure chip;
   retrieving, by the application executed by the mobile device, the secure chip ID and the alias code from the wearable device using the Bluetooth connection; and
   transmitting, by the application executed by the mobile device, the secure chip ID to a transaction account issuer that issued the transaction account, wherein the transaction account issuer links the transaction account with the secure chip ID based on an association between the secure chip ID and the alias code.

2. The method of claim 1, further comprising requesting, by the application, generation of the provisioning script for the secure chip.

3. The method of claim 1, wherein the secure chip comprises a communication antenna and a secure chip ID.

4. The method of claim 1, wherein the secure chip ID is housed in a local memory of a form factor.

5. The method of claim 1, wherein the secure chip is housed with a form factor.

6. The method of claim 1, further comprising storing, by the application, the provisioning script to a local memory housed with a form factor.

7. The method of claim 1, wherein the provisioning script is transmitted from the mobile device to a local memory of a form factor.

8. The method of claim 1, wherein the provisioning script is transmitted from the mobile device to a local memory of a form factor via Bluetooth communication.

9. The method of claim 1, wherein the provisioning script is transmitted from the mobile device to a local memory of a form factor, wherein the local memory is a memory of the form factor that is wearable.

10. The method of claim 9, wherein the form factor is at least one of a bracelet, ring, wrist band, key ring fob, retractable ID, necklace, jewelry charm, lanyard, watch, band, or pin.

11. The method of claim 1, wherein a local memory is in data communication with the secure chip.

12. The method of claim 1, wherein a user securely logs into the application to associate at least one of a newly requested transaction account or the transaction account to at least one of the alias code or an identifier of a form factor.

13. The method of claim 1, wherein the secure chip is utilized in a transaction.

14. The method of claim 1, wherein the secure chip is housed with a form factor that is an activity tracker.

15. The method of claim 1, wherein the secure chip is configured to interact with a radio frequency identification reader coupled to a point of sale system.

16. A system comprising:
a mobile device comprising a processor in communication with an application; and
a tangible, non-transitory local memory of a form factor configured to communicate with the processor,
the tangible, non-transitory local memory having instructions stored thereon that, in response to execution by the processor, cause the processor to perform operations comprising:
- receiving, by the processor, a provisioning script for a secure chip having a communication antenna and a secure chip identifier (ID), the secure chip embedded in a wearable device in communication with the processor;
- transmitting, by the processor, the provisioning script to the secure chip using a Bluetooth connection between the mobile device and the wearable device, wherein the secure chip executes the provisioning script, and wherein an alias code pre-provisioned on the secure chip is associated with a transaction account and wherein the alias code is randomly assigned to the secure chip;
- retrieving, by the processor, the secure chip ID and the alias code from the wearable device using the Bluetooth connection; and
- transmitting, by the processor, the secure chip ID to a transaction account issuer that issued the transaction account, wherein the transaction account issuer links the transaction account with the secure chip ID based on an association between the secure chip ID and the alias code.

17. The system of claim 16, further comprising requesting, by the processor, generation of the provisioning script for the secure chip.

18. The system of claim 16, wherein the secure chip comprises a communication antenna and a secure chip ID.

19. The system of claim 16, wherein the secure chip ID is transmitted to the transaction account issuer for activating contactless payment for the wearable device.

20. An article of manufacture including a non-transitory, tangible computer readable storage medium having instructions stored thereon that, in response to execution by an application, cause the application to perform operations comprising:
- receiving, by the application executed by a mobile device, a provisioning script for a secure chip having a communication antenna and a secure chip identifier (ID), the secure chip embedded in a wearable device in communication with the mobile device;
- transmitting, by the application executed by the mobile device, the provisioning script to the secure chip using a Bluetooth connection between the mobile device and the wearable device, wherein the secure chip executes the provisioning script, and wherein an alias code pre-provisioned on the secure chip is associated with a transaction account and wherein the alias code is randomly assigned to the secure chip;
- retrieving, by the application executed by the mobile device, the secure chip ID and the alias code from the wearable device using the Bluetooth connection; and
- transmitting, by the application executed by the mobile device, the secure chip ID to a transaction account issuer that issued the transaction account, wherein the transaction account issuer links the transaction account with the secure chip ID based on an association between the secure chip ID and the alias code.

* * * * *